(12) United States Patent
Liu et al.

(10) Patent No.: US 8,917,480 B2
(45) Date of Patent: Dec. 23, 2014

(54) MAGNETIC RECORDING TRANSDUCERS HAVING SLIM SHAPED ADDITIONAL POLES

(71) Applicant: Western Digital (Fremont), LLC, Fremont, CA (US)

(72) Inventors: Feng Liu, San Ramon, CA (US); Zhanjie Li, Pleasanton, CA (US); Zhigang Bai, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/918,251

(22) Filed: Jun. 14, 2013

(65) Prior Publication Data

US 2014/0307349 A1 Oct. 16, 2014

Related U.S. Application Data

(60) Provisional application No. 61/811,266, filed on Apr. 12, 2013.

(51) Int. Cl.
*G11B 5/31* (2006.01)
*G11B 5/127* (2006.01)

(52) U.S. Cl.
CPC .................................... *G11B 5/1272* (2013.01)
USPC ............. 360/125.09; 360/125.14; 360/125.59

(58) Field of Classification Search
USPC ................ 360/125.1, 125.14, 125.16–125.2, 360/125.47, 125.52, 125.6, 125.65, 125.09, 360/125.13, 125.59
See application file for complete search history.

(56) References Cited

U.S. PATENT DOCUMENTS

| 7,070,698 | B2 | 7/2006 | Le | |
|---|---|---|---|---|
| 7,113,366 | B1 | 9/2006 | Wang et al. | |
| 7,133,253 | B1 * | 11/2006 | Seagle et al. | 360/125.65 |
| 7,394,621 | B2 * | 7/2008 | Li et al. | 360/125.15 |
| 7,990,654 | B2 * | 8/2011 | Yazawa et al. | 360/125.09 |
| 8,004,794 | B2 | 8/2011 | Zhou et al. | |
| 8,045,292 | B2 | 10/2011 | Toma et al. | |
| 8,179,636 | B1 * | 5/2012 | Bai et al. | 360/125.17 |
| 8,264,792 | B2 | 9/2012 | Bai et al. | |
| 8,335,051 | B2 * | 12/2012 | Nunokawa et al. | 360/125.06 |
| 8,520,336 | B1 * | 8/2013 | Liu et al. | 360/125.1 |
| 2008/0239569 | A1 * | 10/2008 | Yazawa et al. | 360/123.02 |

FOREIGN PATENT DOCUMENTS

| JP | 11161913 | A | * | 6/1999 |
|---|---|---|---|---|
| JP | 2008276902 | A | * | 11/2008 |
| JP | 2010146600 | A | * | 7/2010 |

* cited by examiner

*Primary Examiner* — Will J Klimowicz

(57) ABSTRACT

A magnetic transducer has an air-bearing surface (ABS). The magnetic transducer has a main pole, at least one coil for energizing the main pole and at least one additional pole. The main pole has a yoke and a pole tip having an ABS facing surface. The at least one additional pole is adjacent to the main pole in a down track direction. The additional pole is recessed from the ABS, has a front surface facing the ABS, has at least one side surface, and has at least one flare angle between the front surface and the at least one side surface. The at least one flare angle is measured from the ABS to the at least one side surface and is at least fifty degrees and less than ninety degrees.

23 Claims, 6 Drawing Sheets

MAGNETIC RECORDING TRANSDUCERS HAVING SLIM SHAPED ADDITIONAL POLES

CROSS-REFERENCE TO RELATED APPLICATIONS

This application claims priority to provisional U.S. Patent Application Ser. No. 61/811,266, filed on Apr. 12, 2013, which is hereby incorporated by reference in its entirety.

BACKGROUND

Figures 1A, 1B:
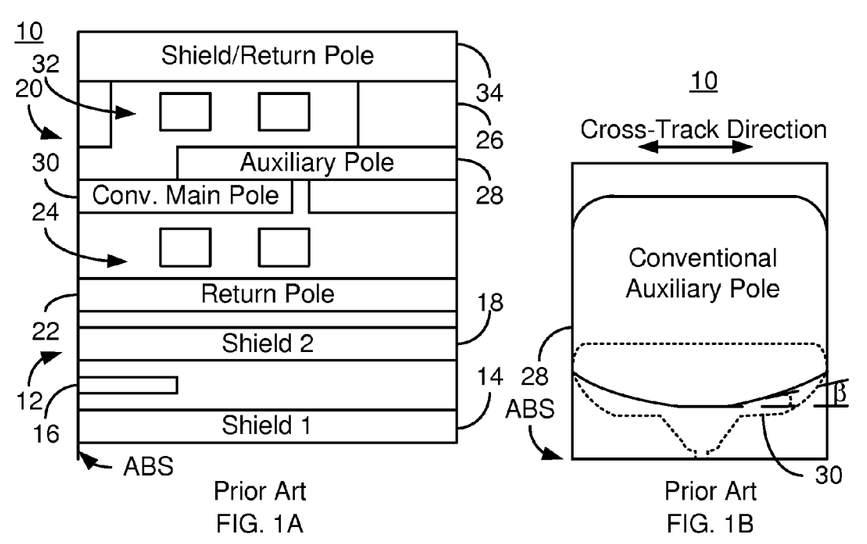
FIGS. 1A and 1B depict side and plan views of a conventional magnetic recording head.

FIGS. 1A and 1B depict side and plan views of a conventional magnetic recording head 10. The magnetic recording head 10 may be a perpendicular magnetic recording (PMR) head. The conventional magnetic recording head 10 includes a read transducer 12 and a write transducer 20. The conventional read transducer 12 includes shields 14 and 18 and sensor 16. The read sensor 16 is typically a giant magnetoresistive (GMR) sensor or tunneling magnetoresistive (TMR) sensor. The write transducer 20 includes a first, or return, pole 22, coils 24 and 32, back gap 26, auxiliary poles 28, main pole 30 and shield/return pole 34. As can be seen in the plan view, the auxiliary poles 28 are recessed from the ABS and have a flare angle, R. The auxiliary poles 28 are also typically the same. The flare angle is typically on the order of twenty nine degrees or less. The front surface of the auxiliary poles 28, which faces the ABS and from which the flare angle is shown is typically on the order of two microns. The width of the auxiliary poles 28 is also typically large. For example, the auxiliary poles 28 typically extend as far as the main pole 30 in the cross track direction. In some cases, this distance is on the order of eleven microns in the cross-track direction. Although not shown, the main pole 30 may have leading and/or trailing edge bevels. In such cases, the main pole 30 is shortest in the down track direction at the ABS.

Although the conventional magnetic recording head 10 functions, there are drawbacks. In particular, the conventional magnetic recording head 10 may not perform sufficiently at higher recording densities. For example, at higher recording densities such as greater than 920 Gb/in$^2$, there are stringent reliability requirements for wide area track erasure (WATER). The conventional magnetic recording head 10 may be unable to meet these standards. Accordingly, what is needed is a system and method for improving the performance of a magnetic recording head.

DETAILED DESCRIPTION OF THE PREFERRED EMBODIMENTS

Figure 2:
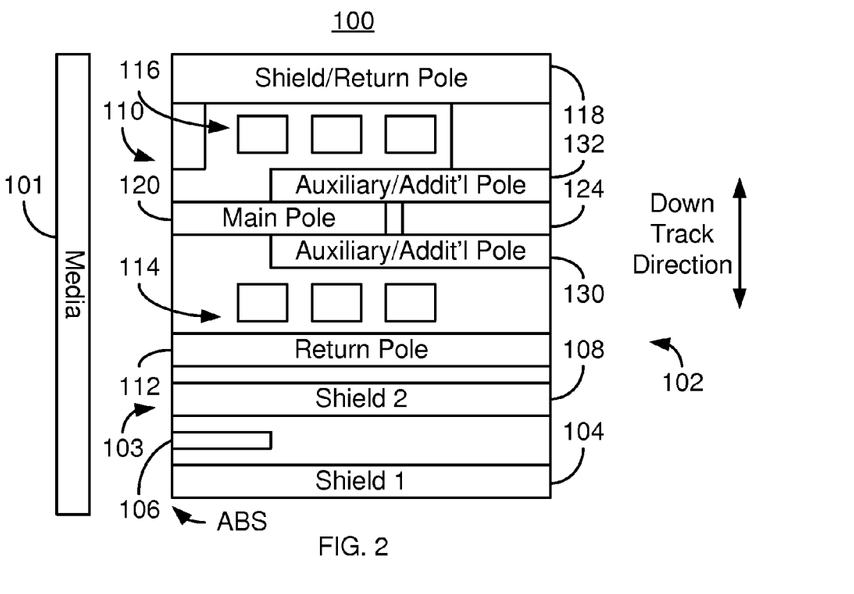
FIG. 2 is a diagram depicting a side view of an exemplary embodiment of a magnetic recording disk drive.

FIG. 2 depicts a side view of an exemplary embodiment of a portion of a disk drive 100. For clarity, FIG. 2 is not to scale. For simplicity not all portions of the disk drive 100 are shown. In addition, although the disk drive 100 is depicted in the context of particular components other and/or different components may be used. For example, circuitry used to drive and control various portions of the disk drive 100 is not shown. For simplicity, only single components are shown. However, multiples of one or more of the components and/or and their sub-components, might be used. The disk drive 100 may be a PMR disk drive. However, in other embodiments, the disk drive 100 may be configured for other types of magnetic recording.

The disk drive 100 includes media 101, and a magnetic recording head 102 residing on a slider and including a read transducer 103 and a write transducer 110. Additional and/or different components may be included in the disk drive 100. Although not shown, the head 102 and thus the transducer 110 are generally attached to a suspension (not shown).

The read transducer 103 includes shields 104 and 108 as well as at least one read sensor 106. The read sensor 106 may be a giant magnetoresistance (GMR) sensor, a tunneling magnetoresistance (TMR) sensor or other sensor. Although one sensor 106 and two shields 104 and 108 are shown, another number of shields and/or sensor(s) may be used.

The write transducer 110 includes at least a main pole 120, coil(s) 114 and 116, and one or more auxiliary poles 130 and 132. The coil(s) 114 and 116 may be part of the same, helical coil or may be parts of two pancake coils. The main pole 120 has a pole tip 121 and a yoke 122. Also shown is back gap 124. The write transducer 110 may also include a return pole 112, and a shield/return pole 118. The shields 104 and 108, shield/return pole 118 and return pole 112 are formed of a soft material, such as NiFe. Main pole 120 and auxiliary poles 130 and 132 may be formed of a high saturation material including but not limited to CoFe and/or CoNiFe.

In the embodiment depicted in FIG. 2, two auxiliary poles 130 and 132 are shown. However, another number may be used. Both of the auxiliary poles 130 and 132 are depicted as adjoining the main pole in the down track direction. However, in other embodiments, one or both of the auxiliary pole(s) 130/132 may be separated from the main pole 130. For example, a nonmagnetic spacer layer (not shown in FIG. 2) may be between one or more of the auxiliary pole(s) 130/132 and the main pole 120. In addition, although shown as having the same thickness, in other embodiments, the auxiliary pole(s) 130/132 may have different thicknesses.

Figure 3:
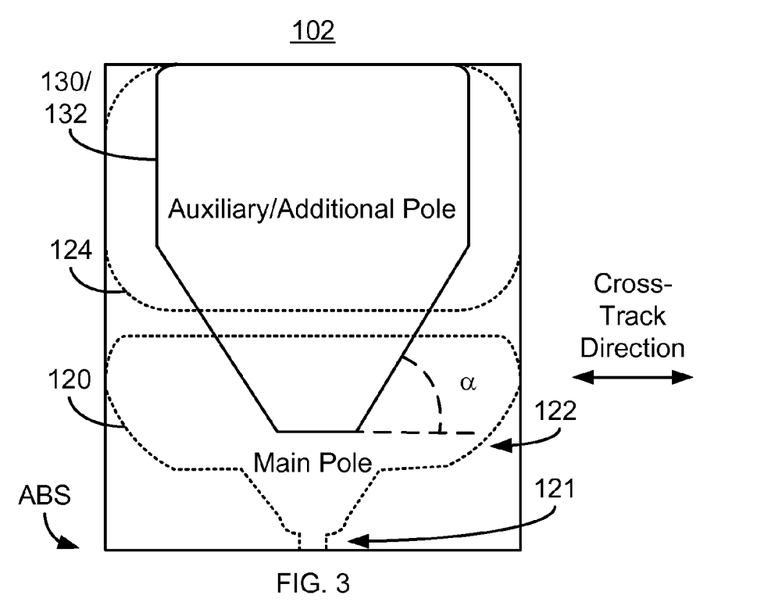
FIG. 3 is a diagram depicting a plan view of an exemplary embodiment of a portion of a magnetic recording head.

FIG. 3 is a plan view of an exemplary embodiment of a portion the magnetic recording disk drive 100. More specifically, an exemplary embodiment of part of the magnetic recording head 102 of the disk drive is shown. For clarity, FIG. 3 is not to scale. For simplicity not all portions of the magnetic recording head 102 are shown. In addition, although the magnetic recording head 102 is depicted in the context of particular components other and/or different components may be used. For example, circuitry used to drive and control various portions of the magnetic recording head 102 is not shown. For simplicity, only single components are shown. However, multiples of one or more of the components and/or and their sub-components, might be used. The magnetic recording head 102 may be a PMR writer. However, in other embodiments, the magnetic recording head 102 may be configured for other types of magnetic recording. For clarity, only the back gap 124, main pole 120 and auxiliary poles 130/132 are shown. In addition, the main pole 120 and back gap 124 are shown in dotted lines in FIG. 3. The auxiliary pole 130/132 is shown in FIG. 3. In some embodiments, the auxiliary pole 130 is as depicted in FIG. 3. In other embodiments, the auxiliary pole 132 is shown in FIG. 3. In still other embodiments, auxiliary poles 130 and 132 are depicted as shown in FIG. 3.

Referring to FIGS. 2-3, the auxiliary pole(s) 130/132 are recessed from the ABS and have an ABS facing surface that is located closest to the ABS in FIG. 3. The auxiliary pole(s) 130/132 also include side surfaces and back side surfaces. The side surfaces are between the back side surface and the front, ABS facing surface. The ABS facing surface may have approximately the same width as the ABS facing surface of the conventional auxiliary pole 22 depicted in FIG. 1B. For example, the front, ABS facing surface of the auxiliary pole(s) 130/132 may be at least eighteen percent of the width of the main pole 120. In some such embodiments, the width of the ABS facing surface of the auxiliary pole(s) 130/132 is two microns, within processing limitations. The auxiliary pole(s) 130/132 may be recessed from the ABS by at least 1.5 microns and not more than 3.5 microns. In some such embodiments, the auxiliary pole(s) 130/132 are recessed from the ABS by at least 1.7 microns and not more than 2.3 microns. For example, the auxiliary pole(s) 130/132 are recessed by two microns, within processing limitations. In other embodiments, the front surface(s) of the auxiliary pole(s) 130/132 may be located another distance from the ABS. Further, the auxiliary poles 130 may be recessed a different distance from the ABS than the auxiliary pole 132. In other embodiments, the auxiliary poles 130 and 132 are recessed the same distance from the ABS.

The side surfaces of the auxiliary pole(s) 130/132 form a flare angle, a, with the ABS facing surface. Stated differently, the flare angle is the angle between the ABS and the side surfaces, as shown in FIG. 3. The flare angle is at least fifty degrees and less than ninety degrees. In some embodiments, the flare angle is not more than sixty four degrees. In some such embodiments, the flare angle is at least fifty-five degrees and not more than fifty-nine degrees. Because the flare angle is large, much of the auxiliary pole 130/132 is thinner in the cross-track direction than for a conventional magnetic recording transducer. Stated differently, even if the ABS facing surface of the auxiliary pole(s) 130/132 has the same width as the conventional auxiliary pole, the portion of the auxiliary pole(s) 130/132 further from the ABS is less wide than the conventional auxiliary pole because the flare angle, a, is larger. In the embodiment shown in FIG. 3, the rear portion of the auxiliary pole(s) 130/132 has back surfaces (i.e. back sidewalls) that are perpendicular to the ABS. These back surfaces adjoin the sidewalls that form the flare angle. Thus, the width of the auxiliary pole(s) 130/132 may be further reduced from that of the conventional auxiliary poles.

In the embodiment shown in FIG. 3, the width of the auxiliary pole(s) 130/132 is also less than or equal to that of the main pole 120. For example, in some embodiments, the maximum width of the auxiliary pole(s) 130/132 is not more than eighty percent of the width of the main pole 120 in the cross track direction. For example, in some embodiments, the yoke 122 of the main pole 120 is approximately 10-20 microns in the cross track direction. The back gap 124 may have a similar width. However, the maximum width of the auxiliary pole(s) 130/132 may be approximately eight-sixteen microns, within processing limitations. Thus, the total, maximum width of the auxiliary pole(s) 130/132 may be less than that of the main pole 120 and less than that of a conventional auxiliary pole.

The magnetic disk drive 100 may exhibit improved performance. More specifically, the auxiliary pole(s) 130/132 may improve performance of the writer 102. Because of the large flare angle, the auxiliary pole(s) 130/132 may be thinner in the cross track direction closer to the ABS. Further, the total width of the auxiliary pole(s) 130/132 may be reduced. Such an embodiment is shown in FIG. 3. Because of their reduced width, the auxiliary pole(s) 130/132 may assist in concentrating the magnetic flux in the main pole 120. The rise time (time to go from zero to the desired field) of the magnetic write field for the main pole 120 may thus be reduced. In addition, the off-track performance of the disk drive 100/writer 102 may be improved. The slim shape in the cross-track direction for the auxiliary pole(s) 130/132 may not only concentrate the magnetic field but also reduce the off-track field. Consequently, the WATER performance of the writer 102 may be enhanced. Higher density magnetic recording is, therefore, facilitated. The auxiliary pole(s) 130/132 may also be easily fabricated. Thus, the benefits of the auxiliary pole(s) 130/132 may be achieved.

Figure 4:
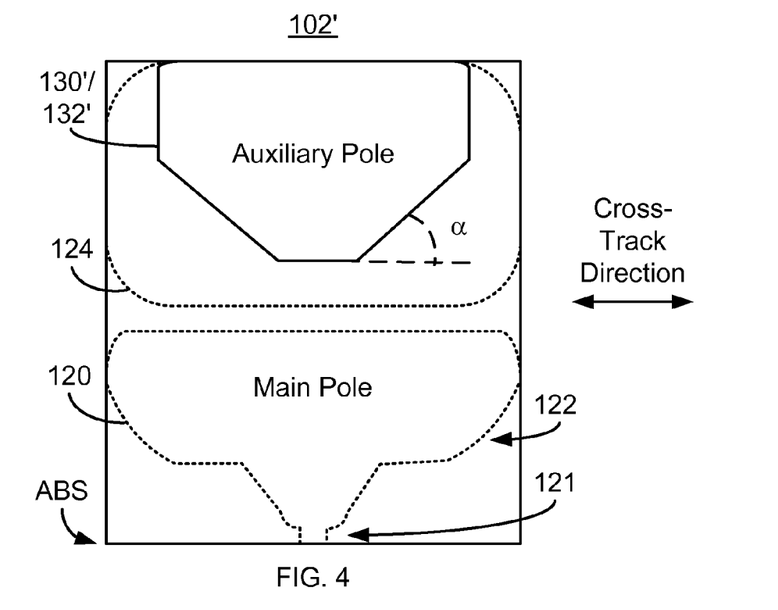
FIG. 4 is a diagram depicting a plan view of another exemplary embodiment of a portion of a magnetic recording head.

FIG. 4 depicts a plan view of another exemplary embodiment of a portion of a magnetic recording disk drive 100. More specifically, an exemplary embodiment of a portion of the magnetic recording head 102' is shown. For clarity, FIG. 4 is not to scale. For simplicity not all portions of the magnetic recording head 102' are shown. The magnetic head 102' is analogous to the magnetic recording head 102. Consequently, analogous components have similar labels. Further, the magnetic recording head 102' may be used in the magnetic disk drive 100.

Referring to FIGS. 2 and 4, one or both of the auxiliary pole(s) 130'/132' are recessed from the ABS and have an ABS facing surface that is located closest to the ABS in FIG. 4. The auxiliary pole(s) 130'/132' also include side surfaces and back side surfaces. The ABS facing surface may have approximately the same width as the ABS facing surface of the auxiliary pole(s) 130/132. The auxiliary pole(s) 130'/132' may be further recessed from the ABS than the auxiliary pole(s) 130/132. The side surfaces of the auxiliary pole(s) 130'/132' form a flare angle, a, with the ABS facing surface. The flare angle is at least fifty degrees and less than ninety degrees. In some embodiments, the flare angle is not more than sixty four degrees. In some such embodiments, the flare angle is at least fifty-five degrees and not more than fifty-nine degrees. Because the flare angle is large, much of the auxiliary pole 130'/132' is thinner in the cross-track direction than for a conventional magnetic recording transducer. The widths of the auxiliary pole(s) 130'/132' are reduced in an analogous manner to the auxiliary pole(s) 130/132. In the embodiment shown in FIG. 4, the width of the auxiliary pole(s) 130'/132' is also less than or equal that of the main pole 120. For example, in some embodiments, the maximum width of the auxiliary pole(s) 130'/132' is not more than eighty percent of the width of the main pole 120 in the cross track direction. Thus, the total, maximum width of the auxiliary pole(s) 130'/132' may be less than that of the main pole 120 and less than that of a conventional auxiliary pole. However, in the embodiment shown in FIG. 4, the auxiliary pole(s) 130'/132' is recessed further from the ABS than the embodiment shown in FIG. 3. In particular, the front surface of the auxiliary pole(s) 130'/132' is within the back gap.

The magnetic recording head 102' and, therefore, the magnetic disk drive 100 may exhibit improved performance. Because of the large flare angle, the auxiliary pole(s) 130'/132' may be thinner in the cross track direction closer to the ABS. Further, the total width of the auxiliary pole(s) 130'/132' may be reduced. Such an embodiment is shown in FIG. 4. Because of their reduced width, the auxiliary pole(s) 130'/132' may assist in concentrating the magnetic flux in the main pole 120. The rise time and WATER performance of the writer 102' may be enhanced. Higher density magnetic recording is, therefore, facilitated. The auxiliary pole(s) 130'/132' may also be easily fabricated. Thus, the benefits of the auxiliary pole(s) 130'/132' may be achieved.

Figure 5:
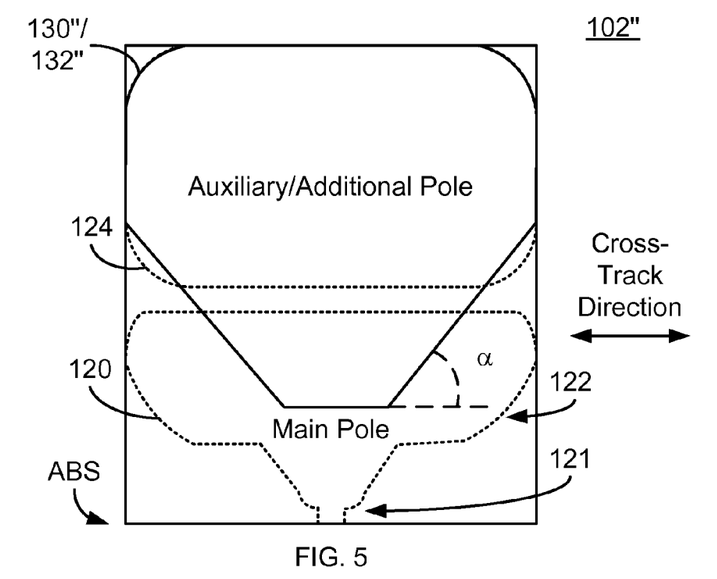
FIG. 5 is a diagram depicting a plan view of another exemplary embodiment of a portion of a magnetic recording head.

FIG. 5 depicts a plan view of another exemplary embodiment of a portion of a magnetic recording disk drive 100. More specifically, an exemplary embodiment of a portion of the magnetic recording head 102'' is shown. For clarity, FIG. 5 is not to scale. For simplicity not all portions of the magnetic recording head 102'' are shown. The magnetic head 102'' is analogous to the magnetic recording head 102. Consequently, analogous components have similar labels. Further, the magnetic recording head 102'' may be used in the magnetic disk drive 100.

Referring to FIGS. 2 and 5, one or both the auxiliary pole(s) 130''/132'' are recessed from the ABS and have an ABS facing surface that is located closest to the ABS in FIG. 5. The auxiliary pole(s) 130''/132'' also include side surfaces and back side surfaces. The ABS facing surface may have approximately the same width as the ABS facing surface of the auxiliary pole(s) 130/132. The auxiliary pole(s) 130''/132'' may be recessed from the ABS substantially the same amount as the auxiliary pole(s) 130/132. The side surfaces of the auxiliary pole(s) 130''/132'' form a flare angle, a, with the ABS facing surface. The flare angle is at least fifty degrees and less than ninety degrees. In some embodiments, the flare angle is not more than sixty four degrees. In some such embodiments, the flare angle is at least fifty-five degrees and not more than fifty-nine degrees. Because the flare angle is large, much of the auxiliary pole 130''/132'' is thinner in the cross-track direction than for a conventional magnetic recording transducer. The widths of the auxiliary pole(s) 130''/132'' are reduced in an analogous manner to the auxiliary pole(s) 130/132. In the embodiment shown in FIG. 5, however the total width of the auxiliary pole(s) 130''/132'' is the same as that of the main pole 120.

The magnetic recording head 102'' and, therefore, the magnetic disk drive 100 may exhibit improved performance. Because of the large flare angle, the auxiliary pole(s) 130''/132'' may be thinner in the cross track direction closer to the ABS. Because of their reduced width, the auxiliary pole(s) 130''/132'' may assist in concentrating the magnetic flux in the main pole 120. The rise time and WATER performance of the writer 102'' may be enhanced. Higher density magnetic recording is, therefore, facilitated. The auxiliary pole(s) 130''/132'' may also be easily fabricated. Thus, the benefits of the auxiliary pole(s) 130''/132'' may be achieved.

Figure 6:
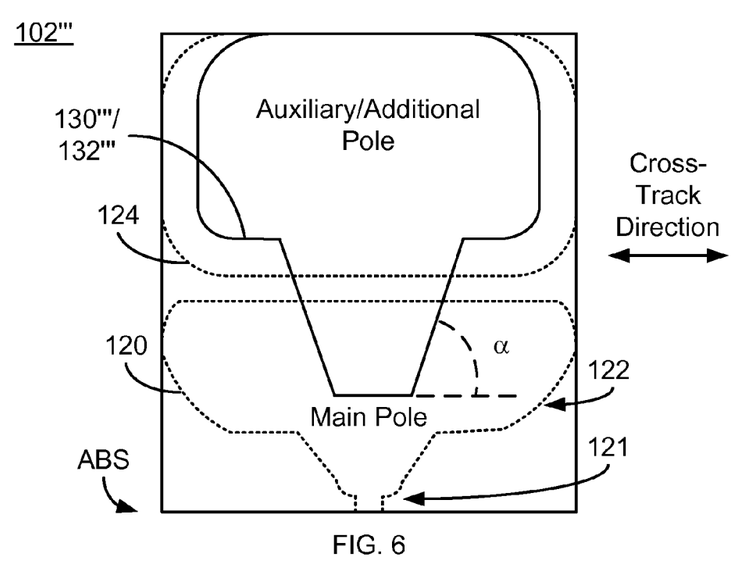
FIG. 6 is a diagram depicting a plan view of another exemplary embodiment of a portion of a magnetic recording head.

FIG. 6 depicts a plan view of another exemplary embodiment of a portion of a magnetic recording disk drive 100. More specifically, an exemplary embodiment of a portion of the magnetic recording head 102''' is shown. For clarity, FIG. 6 is not to scale. For simplicity not all portions of the magnetic recording head 102''' are shown. The magnetic head 102''' is analogous to the magnetic recording head 102. Consequently, analogous components have similar labels. Further, the magnetic recording head 102''' may be used in the magnetic disk drive 100.

Referring to FIGS. 2 and 6, one or both of the auxiliary pole(s) 130'''/132''' are recessed from the ABS and have an ABS facing surface that is located closest to the ABS in FIG. 6. The auxiliary pole(s) 130'''/132''' also include side surfaces and back side surfaces. The ABS facing surface may have approximately the same width as the ABS facing surface of the auxiliary pole(s) 130/132. The auxiliary pole(s) 130'''/132''' may be recessed from the ABS substantially the same amount as the auxiliary pole(s) 130/132. The side surfaces of the auxiliary pole(s) 130'''/132''' form a flare angle, $\alpha$, with the ABS facing surface. The flare angle is at least fifty degrees and less than ninety degrees. In some embodiments, the flare angle is not more than sixty four degrees. In some such embodiments, the flare angle is at least fifty-five degrees and not more than fifty-nine degrees. Because the flare angle is large, much of the auxiliary pole(s) 130'''/132''' is thinner in the cross-track direction than for a conventional magnetic recording transducer. The widths of the auxiliary pole(s) 130''/132'' are reduced in an analogous manner to the auxiliary pole(s) 130/132. In the embodiment shown in FIG. 6, the width of the auxiliary pole(s) 130''/132'' is also less than that of the main pole 120. For example, in some embodiments, the maximum width of the auxiliary pole(s) 130''/132'' is not more than eighty percent of the width of the main pole 120 in the cross track direction. Thus, the total, maximum width of the auxiliary pole(s) 130''/132'' may be less than that of the main pole 120 and less than that of a conventional auxiliary pole. However, in other embodiments, the width of the rear portion of the auxiliary pole(s) 130''/132'' may be the same as that of the main pole 120 and/or back gap 124. Further, the auxiliary pole 130'''/132''' includes side surfaces that face the ABS. Thus, as can be seen in FIG. 6, the auxiliary pole(s) 130'''/132''' may have various shapes.

The magnetic recording head 102''' and, therefore, the magnetic disk drive 100 may exhibit improved performance. Because of the large flare angle, the auxiliary pole(s) 130'''/132''' may be thinner in the cross track direction closer to the ABS. Further, the total width of the auxiliary pole(s) 130'''/132''' may be reduced. Such an embodiment is shown in FIG. 6. Because of their reduced width, the auxiliary pole(s) 130'''/132''' may assist in concentrating the magnetic flux in the main pole 120. The rise time and WATER performance of the writer 102''' may be enhanced. Higher density magnetic recording is, therefore, facilitated. The auxiliary pole(s) 130'''/132''' may also be easily fabricated. Thus, the benefits of the auxiliary pole(s) 130'''/132''' may be achieved.

Figure 7:
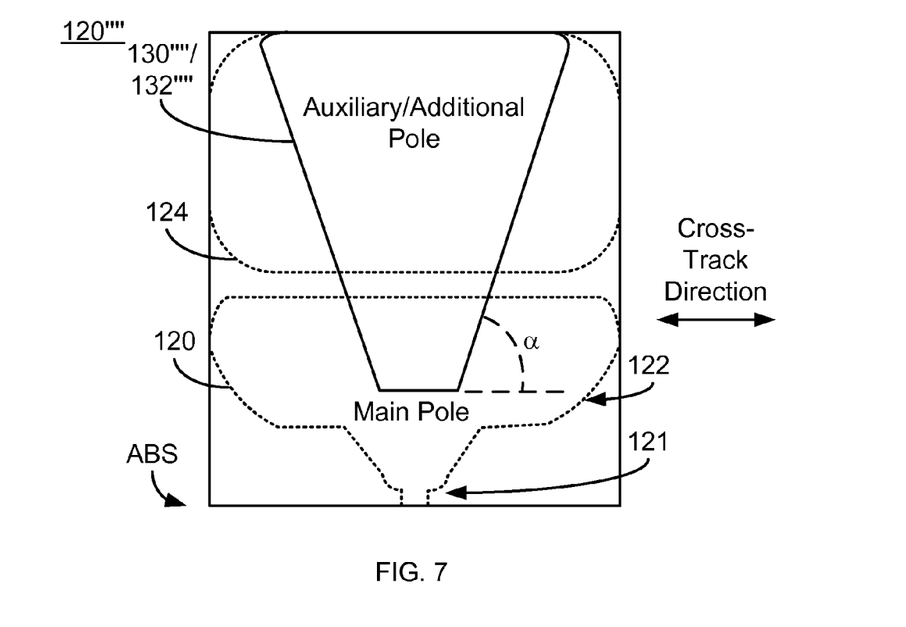
FIG. 7 is a diagram depicting a plan view of another exemplary embodiment of a portion of a magnetic recording head.

FIG. 7 depicts a plan view of another exemplary embodiment of a portion of a magnetic recording disk drive 100. More specifically, an exemplary embodiment of a portion of the magnetic recording head 102'''' is shown. For clarity, FIG. 7 is not to scale. For simplicity not all portions of the magnetic recording head 102'''' are shown. The magnetic head 102'''' is analogous to the magnetic recording head 102. Consequently, analogous components have similar labels. Further, the magnetic recording head 102'''' may be used in the magnetic disk drive 100.

Referring to FIGS. 2 and 7, one or both of the auxiliary pole(s) 130''''/132'''' are recessed from the ABS and have an ABS facing surface that is located closest to the ABS in FIG. 7. The auxiliary pole(s) 130''''/132'''' also include side surfaces. The side surfaces extend all of the way back to the rear surface of the auxiliary pole(s) 130''''/132''''. The ABS facing surface may have approximately the same width as the ABS facing surface of the auxiliary pole(s) 130/132. The auxiliary pole(s) 130''''/132'''' may be recessed from the ABS substantially the same amount as the auxiliary pole(s) 130/132. The side surfaces of the auxiliary pole(s) 130''''/132'''' form a flare angle, α, with the ABS facing surface. The flare angle is at least fifty degrees and less than ninety degrees. In some embodiments, the flare angle is not more than sixty four degrees. In some such embodiments, the flare angle is at least fifty-five degrees and not more than fifty-nine degrees. Because the flare angle is large, much of the auxiliary pole(s) 130''''/132'''' is thinner in the cross-track direction than for a conventional magnetic recording transducer. The widths of the auxiliary pole(s) 130''''/132'''' are reduced in an analogous manner to the auxiliary pole(s) 130/132. In the embodiment shown in FIG. 7, the width of the auxiliary pole(s) 130''''/132'''' is also less than that of the main pole 120. For example, in some embodiments, the maximum width of the auxiliary pole(s) 130''''/132'''' is not more than eighty percent of the width of the main pole 120 in the cross track direction. Thus, the total, maximum width of the auxiliary pole(s) 130''''/132'''' may be less than or equal to that of the main pole 120 and less than or equal to that of a conventional auxiliary pole. The sides forming the flare angle for the auxiliary pole(s) 130'''/132''' extend to the back of the auxiliary pole(s) 130'''/132'''.

The magnetic recording head 102'''' and, therefore, the magnetic disk drive 100 may exhibit improved performance. Because of the large flare angle, the auxiliary pole(s) 130''''/132'''' may be thinner in the cross track direction closer to the ABS. Further, the total width of the auxiliary pole(s) 130''''/132'''' may be reduced. Such an embodiment is shown in FIG. 6. Because of their reduced width, the auxiliary pole(s) 130''''/132'''' may assist in concentrating the magnetic flux in the main pole 120. The rise time and WATER performance of the writer 102''' may be enhanced. Higher density magnetic recording is, therefore, facilitated. The auxiliary pole(s) 130''''/132'''' may also be easily fabricated. Thus, the benefits of the auxiliary pole(s) 130''''/132'''' may be achieved.

Figure 8:
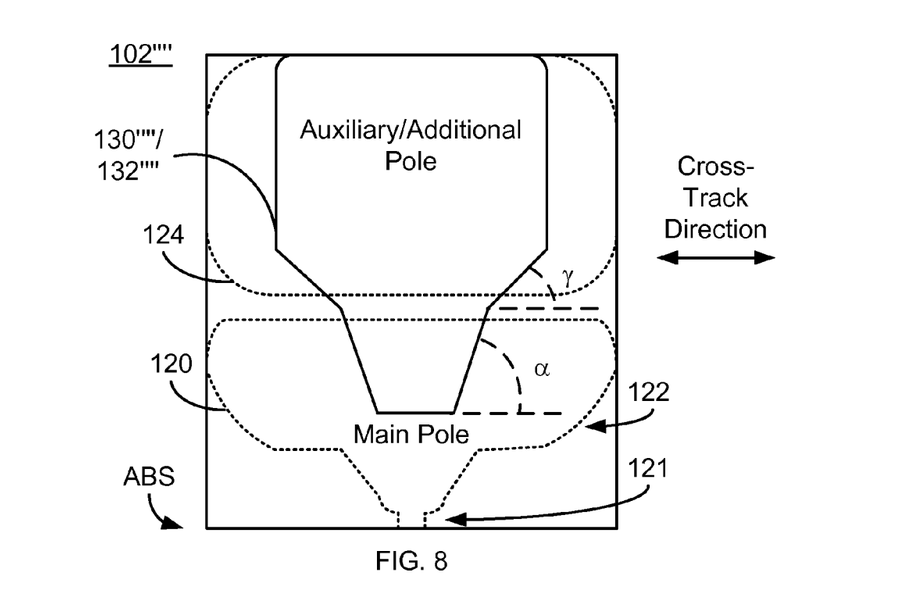
FIG. 8 is a diagram depicting a plan view of another exemplary embodiment of a portion of a magnetic recording head.

FIG. 8 depicts a plan view of another exemplary embodiment of a portion of a magnetic recording disk drive 100. More specifically, an exemplary embodiment of a portion of the magnetic recording head 102'''' is shown. For clarity, FIG. 8 is not to scale. For simplicity not all portions of the magnetic recording head 102'''' are shown. The magnetic head 102'''' is analogous to the magnetic recording head 102. Consequently, analogous components have similar labels. Further, the magnetic recording head 102'''' may be used in the magnetic disk drive 100.

Referring to FIGS. 2 and 8, one or both of the auxiliary pole(s) 130''''/132'''' are recessed from the ABS and have an ABS facing surface that is located closest to the ABS in FIG. 8. The auxiliary pole(s) 130''''/132'''' also include side surfaces and back side surfaces. The ABS facing surface may have approximately the same width as the ABS facing surface of the auxiliary pole(s) 130/132. The auxiliary pole(s) 130''''/132'''' may be recessed from the ABS substantially the same amount as the auxiliary pole(s) 130/132. The portion of the side surfaces of the auxiliary pole(s) 130''''/132'''' that is closest to the ABS form a flare angle, α, with the ABS facing surface. The back portion of the side surfaces of the auxiliary pole(s) 130''''/132'''' that is further from the ABS form an additional angle, γ, with the ABS facing surface. In the embodiment shown, γ is less than α. However, in other embodiments, γ may be greater than α. In addition, although only two segments are shown, the side surfaces of the auxiliary pole(s) 130''''/132'''' may have another number of segments. The side surfaces may also be curved. In some embodiments, the curvature may be concave with respect to the ABS. In other embodiments, the curvature may be convex with respect to the ABS. In still other embodiments, the curvature may change.

The flare angle, α, is at least fifty degrees and less than ninety degrees. In some embodiments, the flare angle is not more than sixty four degrees. In some such embodiments, the flare angle is at least fifty-five degrees and not more than fifty-nine degrees. Because the flare angle is large, much of the auxiliary pole(s) 130''''/132'''' is thinner in the cross-track direction than for a conventional magnetic recording transducer. The widths of the auxiliary pole(s) 130''''/132'''' are reduced in an analogous manner to the auxiliary pole(s) 130/132. In the embodiment shown in FIG. 8, the width of the auxiliary pole(s) 130''''/132'''' is also less than that of the main pole 120. For example, in some embodiments, the maximum width of the auxiliary pole(s) 130''''/132'''' is not more than eighty percent of the width of the main pole 120 in the cross track direction. Thus, the total, maximum width of the auxiliary pole(s) 130''''/132'''' may be less than that of the main pole 120 and less than that of a conventional auxiliary pole.

The magnetic recording head 102'''' and, therefore, the magnetic disk drive 100 may exhibit improved performance. Because of the large flare angle, the auxiliary pole(s) 130''''/132'''' may be thinner in the cross track direction closer to the ABS. Further, the total width of the auxiliary pole(s) 130''''/132'''' may be reduced. Such an embodiment is shown in FIG. 6. Because of their reduced width, the auxiliary pole(s) 130''''/132'''' may assist in concentrating the magnetic flux in the main pole 120. The rise time and WATER performance of the writer 102'''' may be enhanced. Higher density magnetic recording is, therefore, facilitated. The auxiliary pole(s) 130''''/132'''' may also be easily fabricated. Thus, the benefits of the auxiliary pole(s) 130''''/132'''' may be achieved.

Figure 9A:
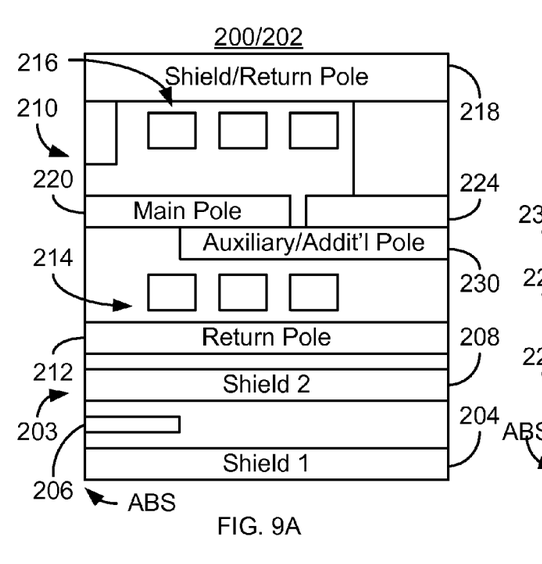
FIGS. 9A and 9B depict side and plan views of another exemplary embodiment of a magnetic recording head.
Figure 9B:
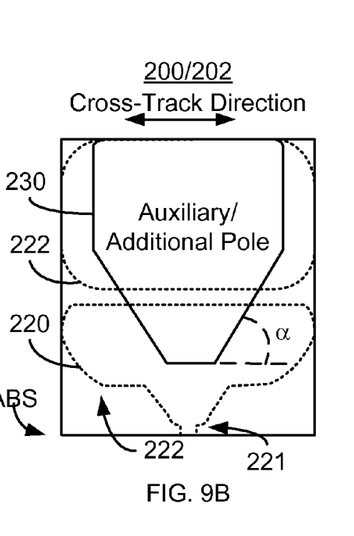

FIGS. 9A and 9B depict side and plan views of another exemplary embodiment of a portion of a magnetic recording disk drive 200. For clarity, FIGS. 9A and 9B are not to scale. For simplicity not all portions of the magnetic recording disk drive 200 are shown. The recording disk drive 200 is analogous to the magnetic recording disk drive 100. Consequently, analogous components have similar labels. For example, the magnetic recording disk drive 200 includes a magnetic read transducer 203 having shields 204 and 208 as well as read sensor 206 that are analogous to the magnetic read transducer 102 having shields 104 and 108 as well as read sensor 106.

The disk drive 200 includes a magnetic recording head 202 residing on a slider and including a read transducer 203 and a write transducer 210 that are analogous to the magnetic recording head 102, read transducer 103 and write transducer 110, respectively. The read transducer 203 includes shields 204 and 208 as well as at least one read sensor 206 that are analogous to the read transducer 103, shields 104 and as well as the read sensor(s) 106, respectively. The write transducer 210 includes at least a main pole 220, coil(s) 214 and 216, return pole 212, shield/return pole 218 and back gap 224 that are analogous to 110 the main pole 120, coil(s) 114 and 116, return pole 112, shield/return pole 118 and back gap 124, respectively. Further, the main pole 220 includes a pole tip 221 and yoke 222 analogous to the pole tip 121 and yoke 122, respectively.

The magnetic recording head 202 also includes an auxiliary/additional pole 230. This auxiliary pole is analogous to the auxiliary pole 130. Thus, the auxiliary pole 230 is also analogous to the auxiliary poles 130'/132', 130''/132'', 130'''/132''', 130''''/132'''' and/or 130''''/132'''' previously shown. The auxiliary pole 230 may thus include one or more of the features of the auxiliary poles 130'/132', 130''/132'', 130'''/

132''', 130''''/132'''' and/or 130'''''/132'''''. However, only a single auxiliary pole 230 is depicted.

The magnetic recording head 202 and magnetic disk drive 200 may share the benefits of the magnetic recording head(s) 102, 102', 102'', 102''', 102'''', and/or 102''''' and the magnetic disk drive 100. For example, the magnetic flux may be concentrated in the main pole 220. The rise time and WATER performance of the writer 202 may be enhanced. Higher density magnetic recording is, therefore, facilitated. The auxiliary pole 230 may also be easily fabricated. Thus, the benefits of the auxiliary pole 230 may be achieved.

Figure 10A:
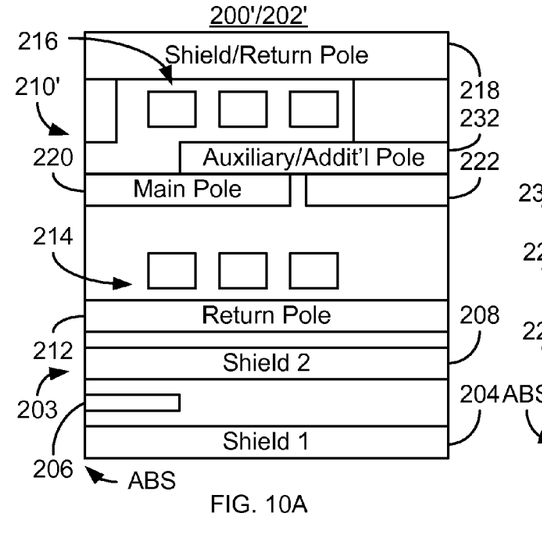
FIGS. 10A and 10B depict side and plan views of another exemplary embodiment of a magnetic recording head.
Figure 10B:
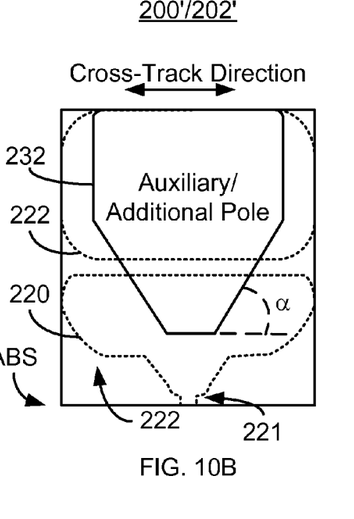

FIGS. 10A and 10B depict side and plan views of another exemplary embodiment of a portion of a magnetic recording disk drive 200' and magnetic recording head 202'. For clarity, FIGS. 10A and 10B are not to scale. For simplicity not all portions of the magnetic recording disk drive 200' are shown. The recording disk drive 200' and magnetic recording head 202' are analogous to the magnetic recording disk drive 200 and magnetic recording head 202. Consequently, analogous components have similar labels.

The magnetic recording head 202' also includes an auxiliary/additional pole 232 instead of the auxiliary pole 230. This auxiliary pole is between the main pole 220 and the coil 216 instead of between the main pole 220 and the coil 214. Thus, only a single auxiliary pole 232 is depicted.

The magnetic recording head 202' and magnetic disk drive 200' may share the benefits of the magnetic recording head(s) 202, 102, 102', 102'', 102''', 102'''', and/or 102''''' and the magnetic disk drive(s) 200 and 100. For example, the magnetic flux may be concentrated in the main pole 220. The rise time and WATER performance of the writer 202 may be enhanced. Higher density magnetic recording is, therefore, facilitated. The auxiliary pole 232 may also be easily fabricated. Thus, the benefits of the auxiliary pole 232 may be achieved.

Figure 11A:
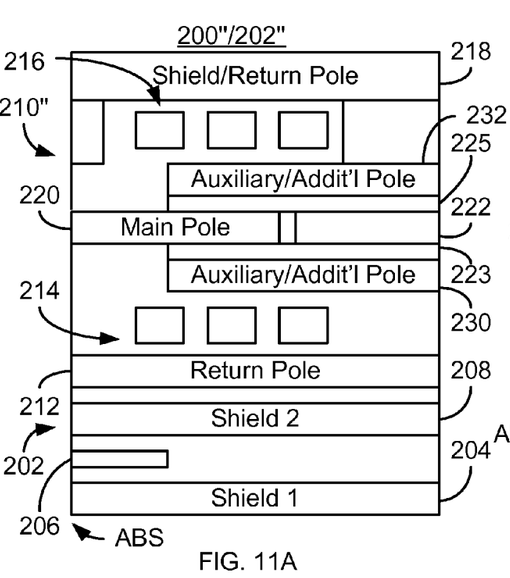
FIGS. 11A and 11B depict side and plan views of another exemplary embodiment of a magnetic recording head.
Figure 11B:
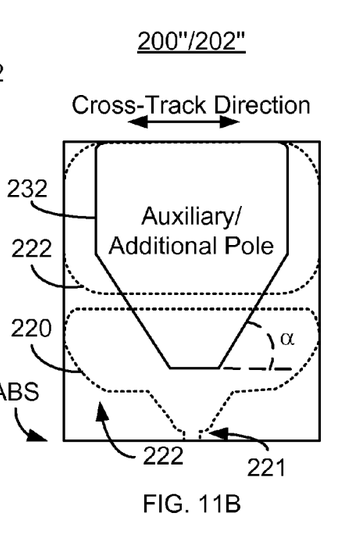

FIGS. 11A and 11B depict side and plan views of another exemplary embodiment of a portion of a magnetic recording disk drive 200'' and magnetic recording head 202''. For clarity, FIGS. 11A and 11B are not to scale. For simplicity not all portions of the magnetic recording disk drive 200'' are shown. The recording disk drive 200'' and magnetic recording head 202'' are analogous to the magnetic recording disk drive 200/200' and magnetic recording head 202/202'. Consequently, analogous components have similar labels.

The magnetic recording head 202'' includes two auxiliary poles 230 and 232. In addition, nonmagnetic layers 223 and 225 are between the main pole and the auxiliary poles 230 and 232, respectively. In other embodiments, one or more of the nonmagnetic layers 223 and 225 may be omitted. Further, one of the auxiliary poles 230 and 232 may be omitted.

The magnetic recording head 202'' and magnetic disk drive 200'' may share the benefits of the magnetic recording head(s) 202, 202', 102, 102', 102'', 102''', 102'''', and/or 102''''' and the magnetic disk drive(s) 200, 200' and/or 100. For example, the magnetic flux may be concentrated in the main pole 220. The rise time and WATER performance of the writer 202 may be enhanced. Higher density magnetic recording is, therefore, facilitated. The auxiliary poles 230 and 232 may also be easily fabricated. Thus, the benefits of the auxiliary poles 230 and 232 may be achieved. Various embodiments of the magnetic recording heads 102, 102', 102'', 102''', 102'''', 102''''', 202, 202' and 202'' having various features are shown. In other embodiments, one or more features of the magnetic recording heads 102, 102', 102'', 102''', 102'''', 102''''', 202, 202' and/or 202'' may be combined in a manner not depicted in the drawings.

Figure 12:
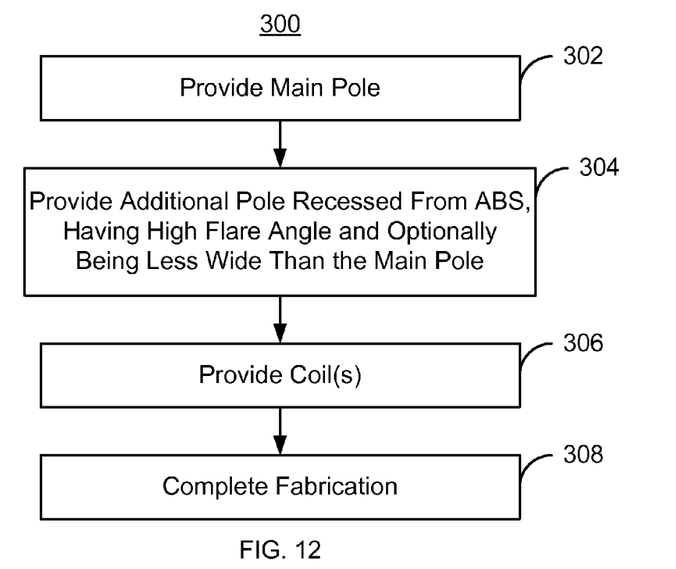
FIG. 12 is a flow chart depicting an exemplary embodiment of a method for fabricating a magnetic recording transducer.

FIG. 12 is a flow chart depicting an exemplary embodiment of a method 300 for fabricating a transducer. The method 300 may be used in fabricating transducers such as the transducers 110, 110', 110'', 110''', 110'''', 110''''', 210, 210' and/or 210'', though other transducers might be so fabricated. For clarity, the method 300 is described in the context of the transducer 110. For simplicity, some steps may be omitted, performed in another order, and/or combined. The magnetic recording transducer being fabricated may be part of a merged head that also includes a read head (not shown) and resides on a slider (not shown) in a disk drive. The method 300 is also described in the context of providing a single magnetic recording transducer. However, the method 300 may be used to fabricate multiple transducers at substantially the same time. The method 300 and system are also described in the context of particular layers. However, in some embodiments, such layers may include multiple sub-layers. The method 300 also may commence after formation of other portions of the transducer.

The main pole is provided, via step 302. Step 302 includes forming the pole tip 121 and yoke 122. Step 302 typically includes multiple deposition, masking and removal steps. One or both of the auxiliary pole(s) 130 and/or 132 are formed, via step 304. Step 304 includes formation of the sidewalls such that the flare angle, α, described above is formed. In other embodiments, the auxiliary pole(s) 130'/132', 130''/132'', 130'''/132''', 130''''/132'''', 230 and/or 232 may be formed. Further, step 306 may include providing one or more of the nonmagnetic layers 223 and 225.

Using the method 300, the transducer 110, 110', 110'', 110''', 110'''', 110''''', 210', 210'' and/or 210''' may be fabricated. The benefit(s) of one or more of the transducer(s) 110, 110', 110'', 110''', 110'''', 110''''', 210', 210'' and/or 210''' may thus be achieved.

We claim:

1. A magnetic transducer having air-bearing surface (ABS) comprising:
    a main pole having a pole tip and a yoke, the pole tip having an ABS facing surface;
    at least one additional pole adjacent to the main pole in a down track direction, the additional pole being recessed from the ABS, having a front surface facing the ABS, having at least one side surface, and having at least one flare angle between the front surface and the at least one side surface, the at least one flare angle being measured from the ABS to the at least one side surface and being at least fifty degrees and less than ninety degrees; and
    at least one coil for energizing the main pole.

2. The magnetic transducer of claim 1 wherein the flare angle is not more than sixty four degrees.

3. The magnetic transducer of claim 1 wherein the flare angle is at least fifty-five degrees and not more than fifty-nine degrees.

4. The magnetic transducer of claim 1 wherein the yoke of the main pole has a first width and wherein the at least one additional pole has a second width less than the first width.

5. The magnetic transducer of claim 4 wherein the second width is not more than eighty percent of the first width.

6. The magnetic transducer of claim 4 wherein the front surface has a third width at least eighteen percent of the first width.

7. The magnetic transducer of claim 1 wherein the at least one additional pole includes a first additional pole and a second additional pole, the main pole being between the first additional pole and the second additional pole.

8. The magnetic transducer of claim 7 wherein the first additional pole and the second additional pole each adjoin the main pole.

9. The magnetic transducer of claim 7 further comprising:
a nonmagnetic spacer layer between the main pole and the first additional pole.

10. The magnetic transducer of claim 1 wherein the at least one additional pole includes at least one additional side surface perpendicular to the ABS, the at least one side surface being between the front surface and the at least one additional side surface.

11. The magnetic transducer of claim 1 wherein the at least one additional pole is recessed from the ABS by at least 1.5 microns and not more than 3.5 microns.

12. The magnetic transducer of claim 11 wherein the at least one additional pole is recessed from the ABS by at least 1.7 microns and not more than 2.3 microns.

13. A magnetic transducer having air-bearing surface (ABS) comprising:
a main pole having a pole tip and a yoke, the pole tip having an ABS facing surface, the yoke having a first width;
a plurality of additional poles adjoining the main pole in a down track direction and sandwiching the main pole, each of the plurality of additional poles being recessed from the ABS, having a front surface facing the ABS, having at least one side surface, and having at least one flare angle between the front surface and the at least one side surface, the at least one flare angle being measured from the ABS to the at least one side surface and being at least fifty-five degrees and less than fifty-nine degrees, each of the plurality of poles having a second width less than the first width, the front surface being not more than two microns wide in a cross-track direction perpendicular to the down track direction, each of the plurality of additional poles including at least one additional side surface perpendicular to the ABS, the at least one side surface being between the front surface and the at least one additional side surface; and
at least one coil for energizing the write pole.

14. A disk drive comprising:
a media,
a slider, and
a magnetic transducer coupled with the slider, the magnetic transducer having air-bearing surface (ABS), a main pole, at least one additional pole adjacent to the main pole in a down track direction and at least one write coil for energizing the main pole, the main pole having a pole tip and a yoke, the pole tip having an ABS facing surface, the at least one additional pole being adjacent to the main pole in the down track direction, the additional pole being recessed from the ABS, having a front surface facing the ABS, having at least one side surface, and having at least one flare angle between the front surface and the at least one side surface, the at least one flare angle being measured from the ABS to the at least one side surface and being at least fifty degrees and less than ninety degrees.

15. A method for fabricating a magnetic transducer having an air-bearing surface location (ABS location) corresponding to an air-bearing surface (ABS) and including a nonmagnetic layer, the method comprising:
providing a main pole having a pole tip and a yoke, the pole tip having an ABS facing surface;
providing at least one additional pole adjacent to the main pole in a down track direction, the at least additional pole being recessed from the ABS, having a front surface facing the ABS, having at least one side surface, and having at least one flare angle between the front surface and the at least one side surface, the at least one flare angle being measured from the ABS to the at least one side surface and being at least fifty degrees and less than ninety degrees; and
providing at least one coil for energizing the main pole.

16. The method of claim 15 wherein the flare angle is not more than sixty four degrees.

17. The method of claim 15 wherein the flare angle is at least fifty-five degrees and not more than fifty-nine degrees.

18. The method of claim 15 wherein the yoke of the main pole has a first width and wherein the at least one additional pole has a second width less than the first width.

19. The method of claim 18 wherein the second width is not more than eighty percent of the first width.

20. The method of claim 18 wherein the front surface has a third width at least eighteen percent of the first width.

21. The method of claim 15 wherein the at least one additional pole includes a first additional pole and a second additional pole, the main pole being between the first additional pole and the second additional pole.

22. The method of claim 21 wherein the first additional pole and the second additional pole each adjoin the main pole.

23. The method of claim 15 wherein the at least one additional pole includes at least one additional side surface perpendicular to the ABS, the at least one side surface being between the front surface and the at least one additional side surface.

* * * * *